J. L. CREVELING.
ELECTRIC REGULATION.
APPLICATION FILED NOV. 5, 1910.
1,112,196.
Patented Sept. 29, 1914.
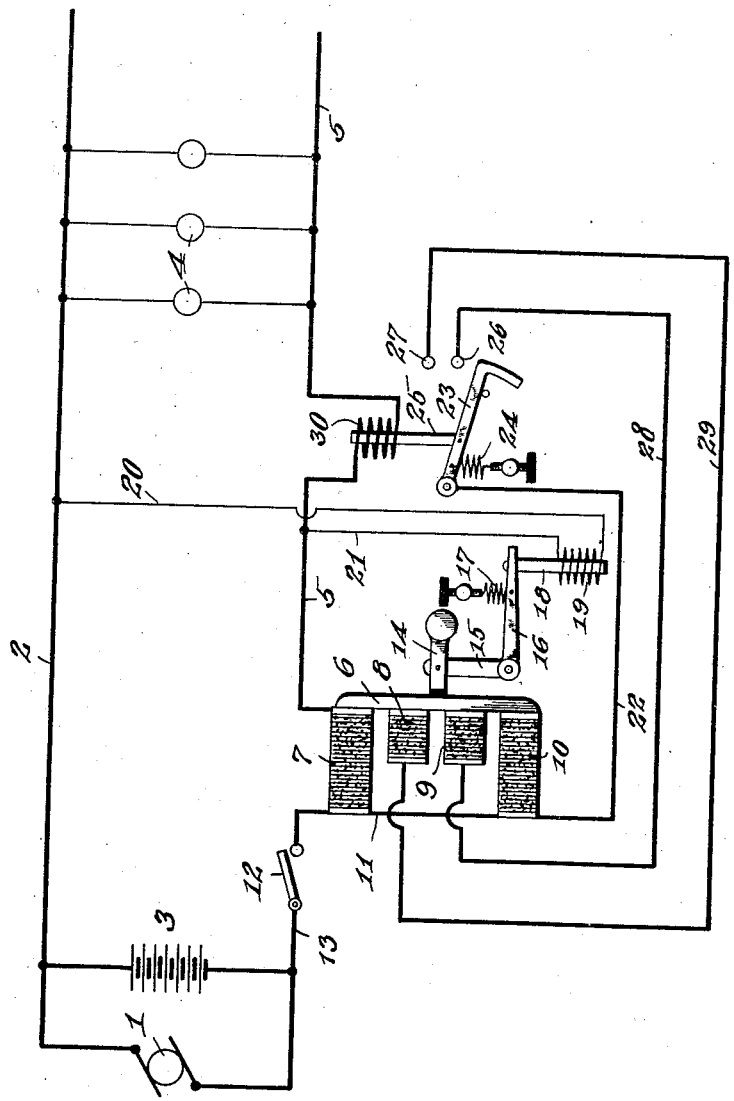
WITNESSES
INVENTOR

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,112,196.   Specification of Letters Patent.   Patented Sept. 29, 1914.

Application filed November 5, 1910. Serial No. 590,837.

*To all whom it may concern:*

Be it known that I, JOHN L. CREVELING, a resident of New York, in the county and State of New York, have invented certain new and useful Improvements in Electric Regulation, as set forth in the annexed specification and drawing, forming a part thereof.

My invention pertains to that class of electric regulation wherein it is desired to regulate an electric circuit in a predetermined manner.

My invention has for its particular object to provide means whereby the voltage upon a circuit may be automatically governed throughout changes of voltage at the source from which said circuit is fed and throughout changes in load upon said circuit.

As my invention is particularly applicable to systems wherein a dynamo or generator is used to charge a storage battery and operate lamps or other translating devices, it will be described with reference to such a system.

The drawing is a diagrammatic representation of one type of such system embodying the essentials of my invention.

In the drawing, 1 represents a dynamo or generator, the positive brush of which is connected as by the lead 2 with the positive side of the storage battery 3 and the positive side of lamps or translating devices indicated at 4. The negative side of the translating devices is carried to the main 5, having in series therewith a coil 30, and connecting with the yoke or movable conducting member 6 in contact with one end of each carbon pile resistance 7, 8, 9 and 10 and so arranged as to be capable by its motion of varying the pressure upon said piles and thus varying the resistance thereof. The opposite ends of the piles 7 and 10 are connected with the main 11, which is led to one side of the switch 12, the opposite side of which is connected to the lead 13 which is carried to the negative side of battery 3 and generator 1. The member 6 is electrically insulated but mechanically united to the member or link 14, pivotally supported by the arm 15 of the bell crank lever 15—16.

17 is an adjustable spring tending to lift the lever 16 so as to compress the carbon piles 7, 8, 9 and 10 and reduce the resistance thereof.

18 is a core of iron or other magnetic material carried by the lever 16 and surrounded by the solenoid 19 connected across the translation circuit as by wires 20 and 21. 19 is so arranged that when energized it tends to pull downwardly on the core 18 so as to decrease the pressure on the carbon piles and increase their resistance. Wire 22 is connected with the main 11 and the pivoted lever 23 normally drawn in a downward direction as by adjustable spring 24.

25 is a core of iron or other magnetic material attached to the lever 23 and so arranged as regards coil 30, that energization of said coil tends to lift the core 25 and move the lever 23 in an upward direction so as to cause contact with the studs 26 and 27 as will hereinafter more plainly appear. The stud 26 is connected with the carbon pile 9 as by means of wire 28 and the stud 27 is connected with the carbon pile 8 as by means of wire 29.

The practical operation of my invention is substantially as follows:—If the switch 12 be closed and the generator be running and supplying sufficient current to operate the translating devices in circuit and charge the battery, current will flow from the generator through lead 2, battery 3 and lead 13 to the generator, also through lead 2, translating devices 4, main 5, coil 30, member 6, carbon piles 7 and 10, main 11, switch 12 and lead 13 and it will be obvious that the voltage impressed upon the translating devices will depend upon the resistance of the piles 7 and 10 which in turn will depend upon the pressure exerted thereupon.

With a small load on the translation circuit, I so adjust the spring 17, that when the normal voltage is reached across wires 2 and 5, any increase in voltage will cause the coil 19 to draw the core 18 downwardly against the action of spring 17 and decrease the pressure upon the carbon piles 7 and 10 in such manner as to increase their resistance and hold the voltage across the translating devices constant. If the voltage then tends to fall across the translating circuit, the spring 17 will compact piles 7 and 10 and decrease their resistance so as to tend to hold the translation circuit voltage constant.

It will be noted that so far, we have considered operation with a light load upon the circuit and for example, I have shown the circuit under these conditions as controlled by two carbon piles 7 and 10 in multiple with each other. It will be obvious, however, that one pile may be used for this purpose or a greater number than 2, or piles in series, if desirable, depending upon the minimum load to be governed and it will be obvious that as the load is increased upon the translation circuit, the resistance device in circuit therewith to govern its voltage will require a greater carrying capacity and a lesser resistance in order to produce the proper conditions in said circuit.

In practice, for small loads with the apparatus as indicated in the drawing, I have found two piles 7 and 10 in multiple, to be a good arrangement, which, however, produces too great a drop and has too small a carrying capacity when the load is increased beyond a certain limit. If now, the load upon the translating circuit be increased until of such dimensions that at times the piles 7 and 10 alone might cause too great a drop, I so adjust the spring 24 that under these conditions the increase in load will cause the coil 30 to lift the core 25 so as to cause contact between 23 and 26 which will throw the carbon pile 9 in shunt with the carbon piles 7 and 10 in an obvious manner. And now the voltage upon the translating devices will be governed by coil 19 as before and the regulator will be automatically adjusted or arranged for hauling heavier loads throughout its range. If the load be again increased to where it is desired that the carrying capacity should be again increased, the lever 23 will be raised to make contact with 27 and thus throw the carbon pile 8 in shunt with the piles 7, 9 and 10. If now, the load be sufficiently reduced, it would under certain conditions be impossible for all the carbon piles in multiple to insert sufficient resistance in the translation circuit to bring the voltage down to the normal but as this load is thrown off the carbon piles 8 and 9 will be thrown out at proper points in the load in such manner that when the proper point of small load is reached, 7 and 10 will be the only carbon piles in the translation circuit and these of such dimensions as to properly carry the load and regulate the same.

It will be obvious that any number of carbon piles may be arranged in the same general manner as shown in the drawing and that the carrying capacity of the regulator as well as its resistance increasing capacity or decreasing capacity, may be varied in accordance with the load so as to produce the results desired in practice and which are well known to those skilled in the art. It will also be obvious that other forms of resistances than carbon piles may be used for the purpose, also that all the resistors which are at any time operative may have their resistance altered by the action of coil 19 as distinguished from devices having fixed shunts around the said resistors or variable resistances in shunt thereto, operated by separate or distinct means.

I do not wish in any way to limit myself to the exact construction shown in the accompanying drawing nor to the exact mode of operation herein set forth as it will be obvious to those skilled in the art that wide departure therefrom may be made without departing from the spirit and scope of my invention, which is as set forth in the following claims:

I claim—

1. Means for regulating an electric circuit comprehending a plurality of regulating elements, a common means for operating the said elements and means for varying the effect of said elements depending upon the current to be regulated.

2. Means for regulating an electric circuit comprehending a plurality of regulating elements, a common means for varying the effect thereof, and means in series in the circuit for rendering a portion of said elements inoperative, depending upon the current in the circuit to be governed.

3. Means for regulating an electric circuit comprehending a plurality of variable resistances, a common means for controlling said resistances, and means in series in the circuit for determining the operativeness and inoperativeness of a portion of said resistances depending on the current in the circuit to be governed.

4. Means for regulating an electric circuit comprehending a plurality of variable resistances, a common means for controlling said resistances responsive to fluctuations in voltage across the circuit to be governed and means in series in the circuit for cutting in and out a portion of said resistances depending for its operation upon the current in said circuit.

5. Means for regulating an electric circuit comprehending a variable resistance therein, a variable resistance in shunt thereto, means for varying the said resistances responsive to voltage fluctuations across said circuit and means for rendering one of said resistances operative depending upon the current in said circuit.

6. Means for regulating an electric circuit comprehending a variable resistance therein, a variable resistance in operative relation to said variable resistance, a common means for operating the said variable resistances and means for throwing them out of operative relationship to each other depending for operation upon the current in said circuit.

7. Means for regulating an electric circuit comprehending a variable resistance in operative relation thereto, a variable resistance adapted to be brought into operative relation with the said first named variable resistance, a common means for governing said variable resistances and means for establishing the above named operative relationship between the variable resistances depending for action upon current in said cirucit.

8. Means for regulating an electric circuit comprehending a regulating element in said circuit, a regulating element coöperating therewith in the regulation of said circuit, means for controlling the coöperation of said last named element dependent upon the current in the circuit to be regulated and means for simultaneously operating both regulating elements responsive to changes in the circuit to be regulated.

9. Means for regulating an electric circuit comprehending a regulating element in said circuit, a regulating element coöperating therewith in the regulation of said circuit, means for controlling the coöperation of said last named element dependent upon the current in the circuit to be regulated and means for simultaneously operating both regulating elements responsive to voltage changes.

JOHN L. CREVELING.

Witnesses:
A. E. TUNC,
M. E. HILLOCK.